(12) United States Patent
Amin et al.

(10) Patent No.: US 6,681,386 B1
(45) Date of Patent: Jan. 20, 2004

(54) METHOD, SYSTEM, AND PROGRAM FOR PARAMETER EXPANSION, GENERATION, AND EXECUTION OF SCRIPTS IN A NETWORKED ENVIRONMENT

(75) Inventors: Sandip Amin, Austin, TX (US); Brian David Nelson, Austin, TX (US); Minh Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,773

(22) Filed: May 22, 2000

(51) Int. Cl.[7] .............................................. G06F 9/45
(52) U.S. Cl. ..................... 717/136; 717/115; 717/137; 717/140
(58) Field of Search ........................ 717/115, 174–178, 717/106, 114–119, 136–161; 709/203; 712/200; 703/23–27

(56) References Cited

U.S. PATENT DOCUMENTS

| | | | | |
|---|---|---|---|---|
| 5,603,027 A | * | 2/1997 | Ohkami ...................... 707/200 |
| 5,838,945 A | * | 11/1998 | Emberson ................... 712/200 |
| 5,920,900 A | * | 7/1999 | Poole et al. ................. 711/216 |
| 6,157,461 A | * | 12/2000 | Doron et al. ................. 358/1.9 |
| 6,286,033 B1 | * | 9/2001 | Kishinsky et al. ........... 709/203 |

OTHER PUBLICATIONS

IBN Technical Disclosure Bulletin, NN9202188, 1992, Mechanism for Trusted Computing Base Definition and Checking.*

IBN Technical Disclosure Bulletin, NN9307501, 1993, Virtual Attributes.*

* cited by examiner

Primary Examiner—Todd Ingberg
Assistant Examiner—Lawrence Shrader
(74) Attorney, Agent, or Firm—Volel Emile; Bracewell & Patterson, L.L.P.

(57) ABSTRACT

A method, system, and program for generating scripts in a networked environment are disclosed. A shell script is written in a programming language in which the shell script is used in a networked environment. The shell script is programmingly converted to a script executable under a specific platform. The script is executed under the specific platform. A script generating command its defined in the shell script. Parameters for the script generating command are defined. The script generating command is executed with the parameters to generate the script. Prefix names having associated prefix variables that are passed to the script generating command are also defined. The prefix names and the prefix variables are obtained for the script generating command. Values for the prefix variables are retrieved from a table. Easy and flexible management and execution of scripts in various scripting languages within a networked environment that includes a collection of systems running under different platforms are provided by the present invention.

26 Claims, 9 Drawing Sheets

26

ECommand stanzaName (Object Type prefix 1, Object Type prefix 2, ..........)

{ Method = {script code goes here.......} } (for one Operating System)
{ Method = {script code goes here.......} } (for another Operating System)
{ Method = {script code goes here.......} } (for a further Operating System)

Where
-stanzaName is the name of the stanza
-Object Type is the type of object passed into ECommand Object
-prefix # is the prefix for the variable

*Fig. 3*

User Script.cmd

```
package com.ibm.websm.test.cmd;
import java.util.*;

ECommand delete (MObject User, Hashtable Action)
{
  Method = {
    ## Delete a user
    if [ [ ${Action_Name} = "Force_Delete" ] ] ; then
       rmuser ${User_Name}
    elif [ [ ${User_Name} = "root" ] ] ; then
       echo "Cannot delete root"
    elif [ [ ${User_ Deletable} = "false" ] ] ; then
       echo "You are not permitted to delete this user"
    else
       rmuser ${User_Name}
    fi
  }
}
```

*Fig. 5A*

```
// A very simple UserObject class representing
// user on a UNIX System
```

⎡15A

```
     public class UserObject extends MObject
90 ⎧ {

// Constructor for UserObject public UserObject (String name)
         {
            _name = name;
28A ⎧  }

// Method to delete the user public void   delete ()
         {
            Hashtable Action = new Hashtable () ;
            Action.put ("Name", "") ;
            String cmd = userScript.delete.expand(this, Action) ;
            // run the script using Java exec call
            Runtime.getRuntime().exec(cmd) ;
28B ⎧  }

// Method to force delete the user public void forceDelete ()
         {
            Hashtable Action = new Hashtable () ;
            Action.put ("Name", "Force_Delete") ;
            String cmd = userScript.delete.expand(this, Action) ;
            // run the script using Java exec call
            Runtime.getRuntime().exec(cmd) ;
28C ⎧  }

// Method to getPropertyValues of a User object public Hashtable getPropertyValues ()
         {
            Hashtable pValues = new Hashtable () ;
            pValues.put ("Name", _name) ;
            pValues.put("Deletable", isDeletable() ) ;
            return pValues ;
28D ⎧  }

// Method to determine if user is deletable public String isDeletable()
         {
            if(_name.equals ("root") )
            return "false";
            return "true";
         } private String _name;
     }
```

*Fig. 5B*

User Script. JAVA

```java
package com.ibm.websm.test.cmd;
import java.util.*;
                                                            ⎰94 import com.ibm.websm.etc*;

public class userScripts extends ECommandGroup { public static ECommand delete = new ECommand () ;

static String [] delete_prefixnames = {
                "User",       ◄─── 84 A
                "Action",     ◄─── 84 B
            };

static String [] delete _varlist_User = {
                "Name",       ◄─── 85
                "Deletable";  ◄─── 86
            };

static String [] delete _varlist_Action = {
                "Name",       ◄─── 87
            };

static String  delete_script =
"\n" +
"\n" +
" ## Delete a user\n" +
" if [ [ ${Action_Name} = \"Force_Delete\" ] ] ; then\n"     +
"    rmuser ${User_Name}\n"       +
" elif [ [ ${User_Name} = \"root\" ] ] ; then\n" +
"      echo \"Cannot delete root\"\n"        +
" elif [ [ ${User_Deletable} = \"false\" ] ] ; then\n" +
"      echo \"You are not permitted to delete this user\"\n" +
" else\n"   +
"    rmuser ${User_Name}\n" +
" fi\n"     +
"\n" +
" ";

static {
        String [ ] [ ] delete_attributeLists = new String [2] [ ] ;
        delete_attributeLists [0] = delete_varlist_User;
        delete_attributeLists [1] = delete_varlist_Action;

delete = new ECommand(
            delete_script,
            delete_prefixnames,
            delete_attributeLists) ;
    } /* end static */
```

*Fig. 5C*

```
##---- Begin Variables ----##
VimName = 'default'
VimCLASS = 'default'
User_Name = 'dummyUser'

User_Deletable = ' '

Action_Name = 'Force_Delete'

##---- End Variables ----##

Delete a user
if [ [ ${Action_Name} = "Force_Delete" ] ] ; then
    rmuser ${User_Name}
elif [ [ ${User_Name} = "root" ] ] ; then
    echo "Cannot delete root"
elif [ [ ${User_Deletable} = "False" ] ] ; then
    echo "You are not permitted to delete this user"
else
    rmuser ${User_Name}
fi
```

Fig. 5D

| FORCE | Boolean |
|-------|---------|
| V | a |
| F | z |

Fig. 6

METHOD, SYSTEM, AND PROGRAM FOR PARAMETER EXPANSION, GENERATION, AND EXECUTION OF SCRIPTS IN A NETWORKED ENVIRONMENT

BACKGROUND OF THE INVENTION

1. Technical Field

The present invention relates in general to the generation and execution of scripts used in a data processing environment, and, in particular, to a method, system, and program for parameter expansion, generation, and execution of scripts in a networked environment using objects.

2. Description of the Related Art

With reference now to FIG. 1, a block diagram of a networked environment 1 is shown. Networked environment 1 illustrates a client system 10 in communication with a server system 15. System administrator 2 inputs parameters of a script 4 into client system 10. Client system 10 passes the parameters to a server system 12. A "script" is a program which includes a set of instructions to a computer application or program. The instructions use the same set of rules as the application or program. A script may be referred to by a name that defines the set of instructions. Expansion of the script occurs when the instructions are substituted for the name wherever the name appears in the program. A "shell script" is a script executed by a command interpreter or shell of an operating system.

In FIG. 1, system administrator 2 desires to execute a command to perform an operation (such as a delete, change password, etc.) on an object (such as User Object 15, which either represents user A or B) stored at server system 12. System administrator 2 uses client system 10 to manage, command, and perform a selected operation on a selected object (e.g., object representing either user A or B) that is stored at server system 12 by passing various parameters (e.g., arguments, flags, and values) defined for script 4 from client system 10 to server system 12. Client system 10 calls for execution of the command on server system 12 via communication line 7. Server system 12 receives and performs the command through an Object Request Broker (ORB) 6 located in server system 12.

Execution of script 4 in a networked environment 1 therefore requires pre-knowledge by system administrator 2 of script 4 in a respective language for each particular operating system, such as Windows NT, UNIX, LINUX, etc. System administrator 2 needs to specifically know the arguments, flags, and values and the specific language for script 4, and these parameters are passed by system administrator 2 to server system 12 through client system 10.

System administrator 2 manually inputs or types in the respective arguments, flags, and values into client system 10. Client system 10 passes the manually inputted parameters to server system 12 via line communication 8 in order to command and perform the desired operation at server system 12. Graphical User Interface programs on client system 10 help eliminate user input errors. However, programs that receive the parameters and send the request to the server system 12 need to perform the parameter substitution. Such programs, when written in C or Java can be error prone if the script requires a large number of parameters. For example the following sample C and Java code remotely execute a script on a Server system:

```
C code:
    Char cmd[1024];
    Sprintf(cmd,"rsh %s -1 %s myScript -d %s -A %s -1 %s",
        hostname, loginName, value1, value2, value3);
    Exec(cmd);
Java code:
    String command = new String("rsh " +hostname +" -1 "
        +loginName + " myScript -d " +value1 +" -A "
        +value2 +" -1 " +value3);
    Runtime.exec(command);
```

The above code compiles correctly, but fails to execute if the programmer omits the '-' in front of any of the flags.

Easy and flexible management and execution of script 4 in various scripting languages (e.g., text executable code, korn shell, Perl, DOS Bat file, ASCII, etc.) within a networked environment that includes a collection of systems running under different types of operating systems such as Windows NT, UNIX, LINUX, etc. presently does not exist. Therefore, an improved way of remotely implementing a script to execute a command in a networked environment is needed and desired.

SUMMARY OF THE INVENTION

It is therefore one object of the present invention to a method, system, and program for parameter expansion, generation, and execution of a script in a networked environment using objects.

It is another object of the present invention to provide a method, system, and program for parameter expansion, generation, and execution of a script that do not require pre-knowledge of the script language and the respective parameters of the script on the client system.

It is a further object of the present invention to provide a method, system, and program for parameter expansion, generation, and execution of a script that do not require script evaluation on the client side and that do not require passing of the script from the client side to the server side.

It is also another object of the present invention to provide a method, system, and program for parameter expansion, generation, and execution of a script that generate and dynamically expand a script and evaluate respective parameters for the script in various programming languages.

It is still a further object of the present invention to provide easy and flexible management and execution of a script in various scripting languages within a networked environment that includes a collection of systems running under different platforms.

The foregoing objects are achieved as is now described. A method, system, and program for generating scripts in a networked environment are disclosed. A shell script is written in a programming language in which the shell script is used in a networked environment. The shell script is programmingly converted to a script executable under a specific platform. The script is executed under the specific platform. A script generating command is defined in the shell script. Parameters for the script generating command are defined. The script generating command is executed with the parameters to generate the script. Prefix names having associated prefix variables that are passed to the script generating command are also defined. The prefix names and the prefix variables are obtained for the script generating command. Values for the prefix variables are retrieved from a table. Easy and flexible management and execution of scripts in various scripting languages within a networked environment that includes a collection of systems running under different platforms are provided by the present invention.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 shows a general format or syntax for the script generating command (e.g., "Ecommand") in accordance with the present invention;

FIG. 5A is a sample code for an original script generating command file that is used to develop script generating command (e.g., "Ecommand") in accordance with the present invention;

FIG. 5B is an exemplary and simplified JAVA user object class that represents the user objects and is written on the server system and used in accordance with the present invention to provide parameter expansion, generation, and execution of a script in a networked environment using objects;

FIG. 5C is an exemplary JAVA command file generated from the original command file of FIG. 5A in which the generated JAVA file is compiled by a compiler to produce the script generating command (e.g., "Ecommand") in accordance with the present invention;

FIG. 5D is an exemplary script that is produced after parameter evaluation and expansion by the script generating command (e.g., "Ecommand") in accordance with the present invention;

FIG. 6 is a exemplary table (e.g., hash table) used to generate a script and respective arguments, flags, and values in accordance with the present invention.

DETAILED DESCRIPTION OF ILLUSTRATIVE EMBODIMENT

The present invention provides a method, system, and program for parameter expansion, generation, and execution of a script in a networked environment using objects. The present invention does not require pre-knowledge of the arguments, flags, and values for the script and does not require manual inputting of the script and the respective arguments, flags, and values into the client system. The present invention also does not require script evaluation on the client side and further does not require passing of the script from the client side to the server side. The present invention generates and dynamically expands a script and evaluates arguments, flags, and values within various programming languages. Furthermore, the present invention provides easy and flexible management and execution of a script in various scripting languages (e.g., text executable code, korn shell, Perl, DOS Bat file, ASCII, etc.) within a networked environment that includes a collection of systems running different platforms, such as Windows NT, UNIX, LINUX, etc.

A "client system" is generally a system that initiates a request. A "server system" is generally a system that receives a request. A "networked environment" includes a collection of client and server systems running different platforms, such as Windows NT, UNIX, LINUX, that each supports a scripting language. A "managed object" represents a resource on the server system that is able to be managed locally or remotely. Exemplary managed objects include a user or disk device. An "object request broker" is located on the server side and communicates to the client system through a communication line. The object request broker is a system that enables code on client machines to access objects or resources on server machines seamlessly.

Figure 1:
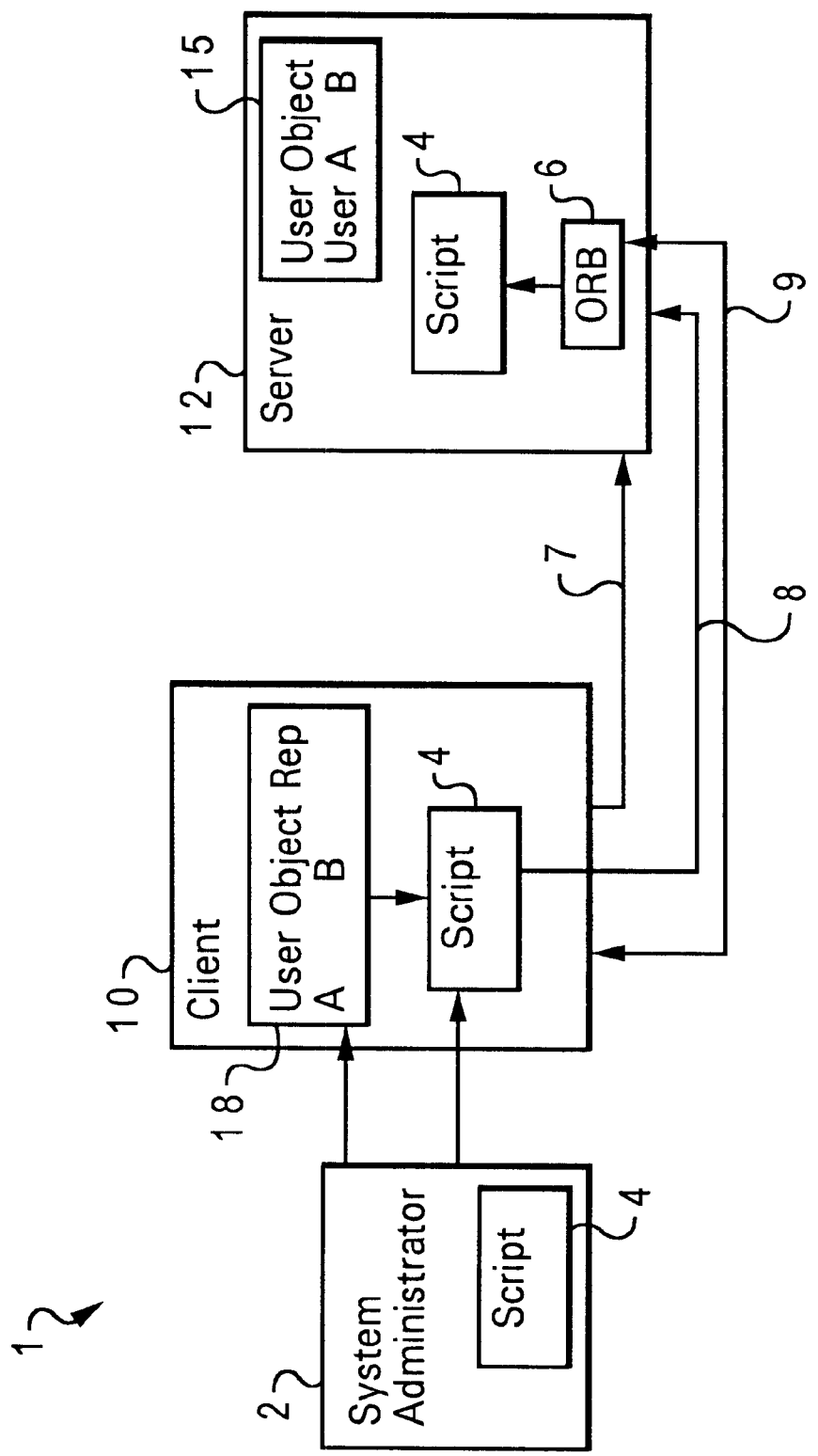
FIG. 1 is a block diagram of a networked environment illustrating the inputting of parameters on the client system and passing of the script for a selected command on a selected object from the client system to the server system in accordance with the prior art.
Figure 2A:
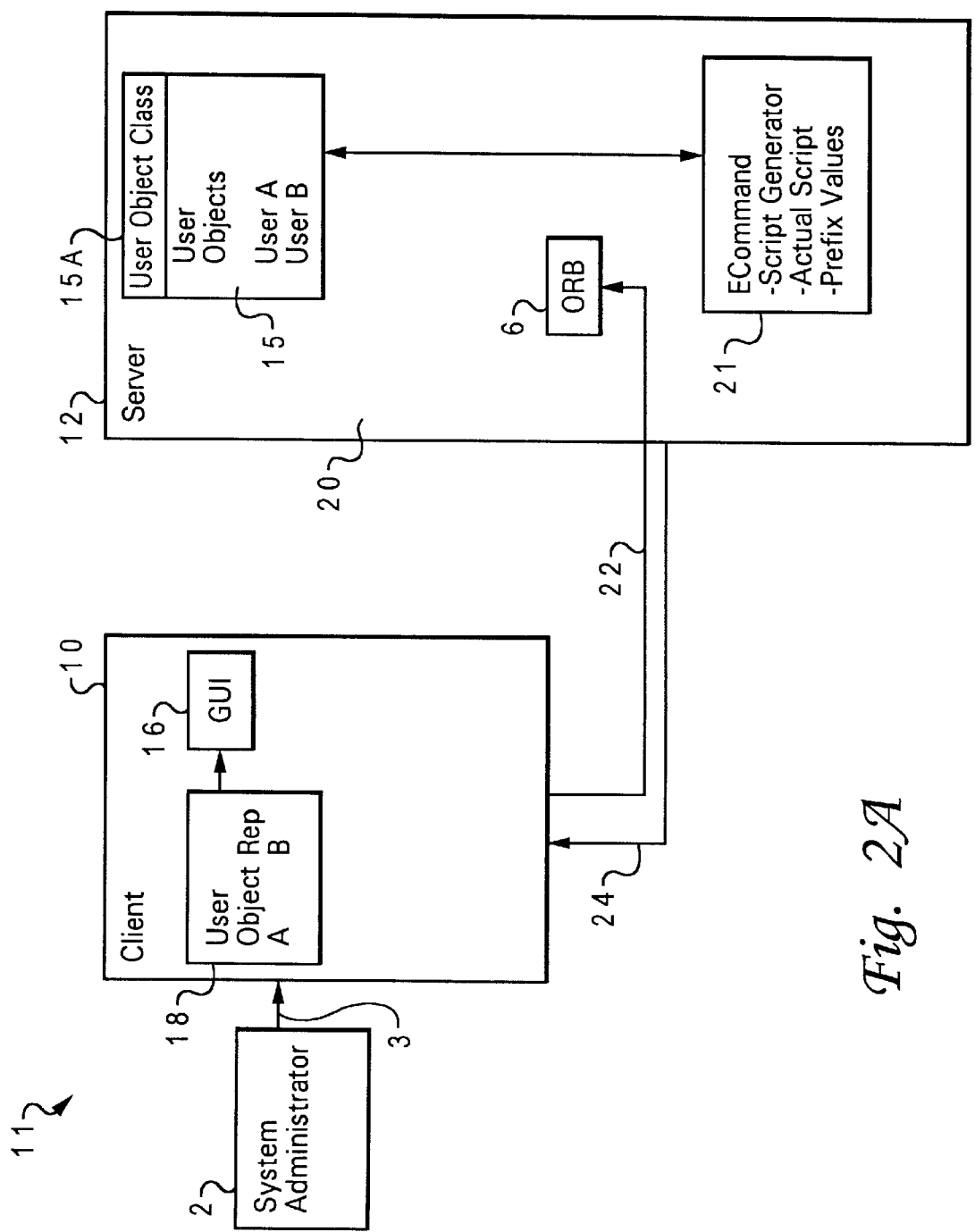
FIG. 2A is a block diagram of a networked environment illustrating the parameter expansion, generation, and execution of a script using objects in accordance with the present invention.
Figure 2B:
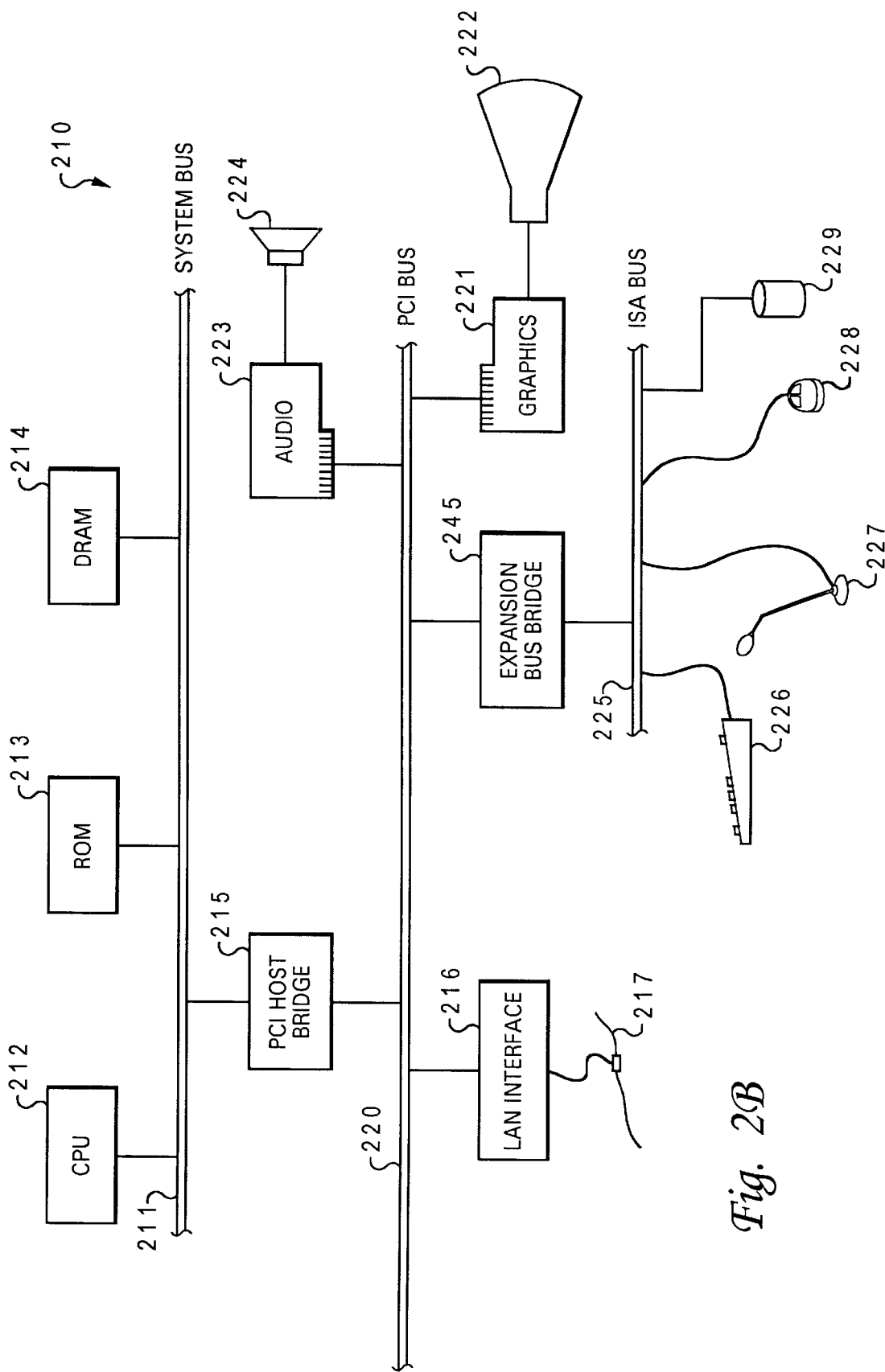
FIG. 2B is a hardware block diagram of an exemplary data processing system, which may be server system or client system, that is used by the present invention.

With reference now to the figures and in particular with reference to FIG. 2A, a block diagram of a networked environment 11 illustrating the topology of the present invention for parameter expansion, generation, and execution of a script in a networked environment using objects is shown. Client system 10 is in communication with server system 12. FIG. 2B shows a hardware block diagram of an exemplary data processing system 210, which may be client system 10 or server system 12. As shown in FIG. 2B, a central processing unit (CPU) 212, read only memory (ROM) 213, and a Dynamic Random Access Memory (DRAM) 214 are connected to a system bus 211 of data processing system 210. CPU 212, ROM 213, and DRAM 214 are also coupled to a PCI local bus 220 of data processing system 210 through a PCI host bridge 215. PCI host bridge 215 provides a low latency path through which processor 212 may directly access PCI devices mapped anywhere within bus memory and/or I/O address spaces. PCI host bridge 215 also provides a high bandwidth path allowing PCI devices to directly access DRAM 214.

Additionally in FIG. 2B, an audio adapter 223 may be attached to PCI local bus 220 for controlling audio output through speaker 224. A graphics adapter 221 may be attached to PCI local bus 220 for controlling visual output through display monitor 222. Also attached to PCI local bus 220 is a local-area-network (LAN) interface adapter 216. LAN interface adapter 216 is for connecting computer system 210 to a local-area network (LAN) 217. A PCI-to-ISA bus bridge, such as an expansion bus bridge 245, may be utilized for coupling an ISA bus 225 to PCI local bus 220. Although the illustrated exemplary embodiment describes a PCI local bus 220 and an ISA bus 225, the present invention is not limited to these particular bus architectures. Rather, the present invention can be utilized in any bus system having other different bus architectures. As shown, a keyboard 226, a microphone 227, a mouse 228, and a hard disk drive 229 may be attached to ISA bus 225 for performing certain basic I/O functions.

The present invention provides a script-generating command (e.g., "ECommand"), which is shown as ECommand 21 in FIG. 2A. ECommand is a JAVA class that provides a mechanism to pass object values to a shell script. ECommand is used to store a large shell script which may be difficult to explicitly declare in a JAVA program. When executing shell scripts from JAVA or other such program, values need to be passed to the script. An exemplary script that requires values to be passed is as follows:

String command=new String ("myScript–d"+aValue+"–A"+Value1+"–c–x");
RunTime.exec(command).

ECommand allows remote execution of scripts on different platforms to be stored inside one JAVA class for execution in a networked environment. For example, the following piece of C-code remotely executes a script named "MyScript" from client system 10:

char cmd[1024];
sprint (cmd, "rsh %s–l%s MyScript –d %s –A %s –l%s", hostname, loginName, value1, value2, value3).

However, this C-code is only able to execute "MyScript" in a UNIX server. JAVA programming allows references of ECommand 21 to enable the script to be executed on different platforms (e.g., AIX, NT, LINUX, UNIX). Exemplary references of ECommand 21 in JAVA code to execute MyScript in AIX, NT, and LINUX are as follows:

```
Hashtable params;
params.put("value1", value1);
params.put("value2", value2);
params.put("value3", value3);
String cmd:
if (runningOnAIX)
    cmd = MyECommand.myAIXScript.expand(params);
elseif(runningOnNT)
    cmd = MyECommand.myNTScript.expand(params);
elseif(runningOnLINUX)
    cmd = MyECommand.myLINUXScript.expand(params);
Runtime.exec(cmd).
```

Referring back to FIG. 2A, managed object class 15 defines objects on server system 12 (i.e. User Object defined for User A or User B). Objects 15 on server system 12 are represented by User Object representation class 18 at client system 10. Client system 10 contains Graphical User Interface (GUI) 16, which performs the representation of objects and icons from server system 12 to client system 10. GUI application 16 is able to represent managed objects 15 in server system 12 at client system 10.

In implementing the present invention, server system 12 is set up and installed with the appropriate classes and objects, which include the classes and objects discussed above. A software developer or other such person produces an original command file for script generation (i.e. script-generating ECommand). Software build tools are used to generate a script-generating command file in JAVA or another language program(s) from the original command file. The JAVA or other program language script-generating command file is compiled by the software developer using a respective compiler to produce the script-generating ECommand 21 (e.g., "ECommand.class") which is stored onto server system 12. Script-generating ECommand 21 (e.g., "ECommand.class") on server system 12 is able to generate therein scripts that are generic and that are able to be used in a networked environment having various operating systems. Also, the software developer writes, and defines the managed object class(es) (such as User Object class 15A in FIG. 2A). The managed object class (i.e. User object class 15A) is/are stored in server system 12.

After the appropriate classes and objects have been installed and set up by the software developer, system administrator 2 or other such person at client system 10 is then able to use the present invention to perform a selected operation on a selected object (e.g., via communication line 3 of FIG. 2A). An instance of managed objects 15 on server system 12 is selected by system administrator 2 selecting the respective instance of object representation 18 at client system 10. GUI 16 determines which object representation 18 and operation request to process. Selected object representation 18 and the selected operation are passed through an Object Request Broker (ORB) 6 on server system 12. GUI 16 accesses managed object class 15A through an Object Request Broker (ORB) 6. Thus, the selected instance of object representation 18 at client system 10 causes selected managed object 15 at respective managed object class 15A in server system 12 to call script-generating ECommand 21 within server system 12. ECommand 21, in turn, receives selected managed object 15 and the selected operation, and ECommand 21 generates the script with the respective values expanded and generated, which is known as parameter expansion. The script is then able to be respectively generated and used on server system 12 without having been passed from client system 10.

Script-generating ECommand 21 is a script generator and provider for command execution and processing. ECommand 21 contains actual script (e.g., scripts for different or multiple operating systems, such as UNIX, LINUX, etc., in a networked environment) along with a list of variables or values associated with a prefix name (hereinafter referred to as "prefix values"). ECommand 21 is installed and resides on server system 12. Selected managed object 15 is the caller of script-generating ECommand 21. The selected object and the selected or requested operation are passed from client system 10 to server system 12. Values needed for the script are retrieved from these objects and value-defining tables (such as hash tables defined in JAVA), which will be discussed later in more detail. When ECommand 21 is called and executed by a managed object, ECommand 21 evaluates the script to determine which object values are needed for the indicated prefix values. ECommand 21 then generates and expands the script for execution. The process in which these variables or values are evaluated and substituted is known as "parameter expansion". An exemplary parameter expansion is the Korn shell usage of $1, $2, $3, etc. The numbers "1", "2", and "3" represent the respective first, second, and third argument parameter of a shell script while the $ sign is the argument expansion or evaluation. In FIG. 2A, ECommand 21 evaluates the script and determines the object values and variables for the User B, who is the user on which the selected operation is to be performed and is the caller in this example.

Referring now to FIG. 3, a general format or syntax 26 for the script-generating command or ECommand 21 is shown. As an example, script-generating command files (or ECommand files) are basically defined as files that end with the ".cmd" extension in JAVA programming. The format or syntax 26 for these command files includes an ECommand stanzaName (i.e. name of an operation) 28, Object Types (i.e. types of objects) 27, and various prefix values 29 to be obtained and defined. StanzaName 28 identifies the stanza. The stanza is generally a record that defines scripts that require parameter substitutions or commands, and the stanza is generally a structure that has a tag and some data within the structure (stanzas identify various operations, such as delete, change password, etc.). Object Type 27 is the type of object passed into ECommand Object 20 while prefix values 29 are defined with the respective argument(s) or value(s). Object Type 27 is typically a class (i.e. JAVA class) representing a managed object 15 on server system 12 or is a value-defining table, such as a hash table defined in JAVA, from which values or arguments for prefix values 29 are obtained. If Object Type 27 is a value-defining table, then ECommand 21 calls a method to obtain the respective variable values or properties from the defining table (e.g., executes a "get" method of hash table in JAVA).

The obtaining method obtains values of prefix names (e.g., an object and operation 15 selected by system administrator 2 at client system 10) and can be used to retrieve values associated with a key stored in the table. A value-defining table is generally a data structure which allows association of values to a key and to efficiently look up a value associated to a given key. If the Object Type 27 is a managed object class (such as User Object class 15A in FIG. 2), then the script-generating ECommand 21 needs to know what method on the managed object class to call. In the present example, a class (e.g., JAVA class) called "Mobject" represents the managed object 15, and the method or methods 30 that ECommand 21 calls is the "getProperty Values" method in order to obtain the properties and values for the managed object 15.

FIG. 3 shows a number of methods 30, which may be any type of suitable method, that have been defined and that are able to be called by a managed object 15 for different platforms or operating systems. A build process converts the original script-generating command file into a program language script-generating command file (i.e. JAVA or other language program file). The program language script-generating file is then able to be compiled into an ECommand 21 which is then installed onto the server system 12.

The shell script stored inside Ecommand 21 has to be enclosed inside the stanza or record "Method". For example, the following shell script adds a list of groups to a given user name:

```
ECommand addGroup (Mobject user, Hashtable Group)
{
    Method = {
        for group in ${Group_Name[*]}; do
            chuser -g $group ${User_Name}
        done
    }
}.
```

This shell script takes two arguments: a user name (e.g., "User") and a list of group names (e.g., "Group"). The build process uses a parsing program that recognizes the stanza or record Method in ".cmd" files. The parsing program creates a JAVA program with a static String named "addGroup_script" that is initialized as follows:
  static String addGroup_script =
"\n"+
"  for group in ${Group_Name[*]}; do\n"
"  chuser -g $group $ {User_Name}\n"
"  done\n"
"";.
  The parsing program next takes the two arguments "user" and "group of the method addGroup" defined in the original ECommand file and creates the following JAVA -continued

```
strings:
static String [] addGroup_prefixnames= {
                "User",
                "Group",
            };
static String [] addGroup_varlist_User = {
                "Name",
            };
static String [] addGroup_varlist_Group = {
                "Name",
            };
static {
    String[][] addGroup_attributeLists = new String[2][];
    addGroup_attributeLists[0] = addGroup_varlist_User;
    addGroup_attributeLists[1] = addGroup_varlist_Group;
    addGroup = new ECommand(
        addGroup_script,
        addGroup_prefixnames,
        addGroup_attributeLists);
}/*end static*/.
```

The base of ECommand 21 has a method called expand( ) that will use the String variables to correctly evaluate and substitute the values for the arguments. In this example, before the expand( ) method is called, the caller constructs two objects. The first object is an object of type MObject class, and the second object is a hash table. Within the expand method, if the argument passed is a MObject class, then the value of the argument (in this case 'Name' For User prefix) is evaluated by calling the getPropertyValue( ) method of the MObject class. If the object is a hash table, then the value (also 'Name' in this case for Group prefix) of the get( ) method of the hash table is called. After evaluating each of the arguments, the values are stored in the shell variables User_Name and Group_Name.

An example of calling expand( ) method is shown as follows:
  MObject obj=getMObject("minh");//Obtain the MObject
  Hashtable groupValues=new Hashtable( );
  groupvalues.put("Name", "staff");
  String command=UserScripts.addGroup.expand(obj, groupvalues);
  RunTime.exec(command).

This above example illustrates how the addGroup script is called to add the group named 'staff' to a user 'minh' represented by 'obj'. When the script addGroup is executed, the variables User_Name will contain 'minh' and the variable Group_Name will contain 'staff'.

Figure 4:
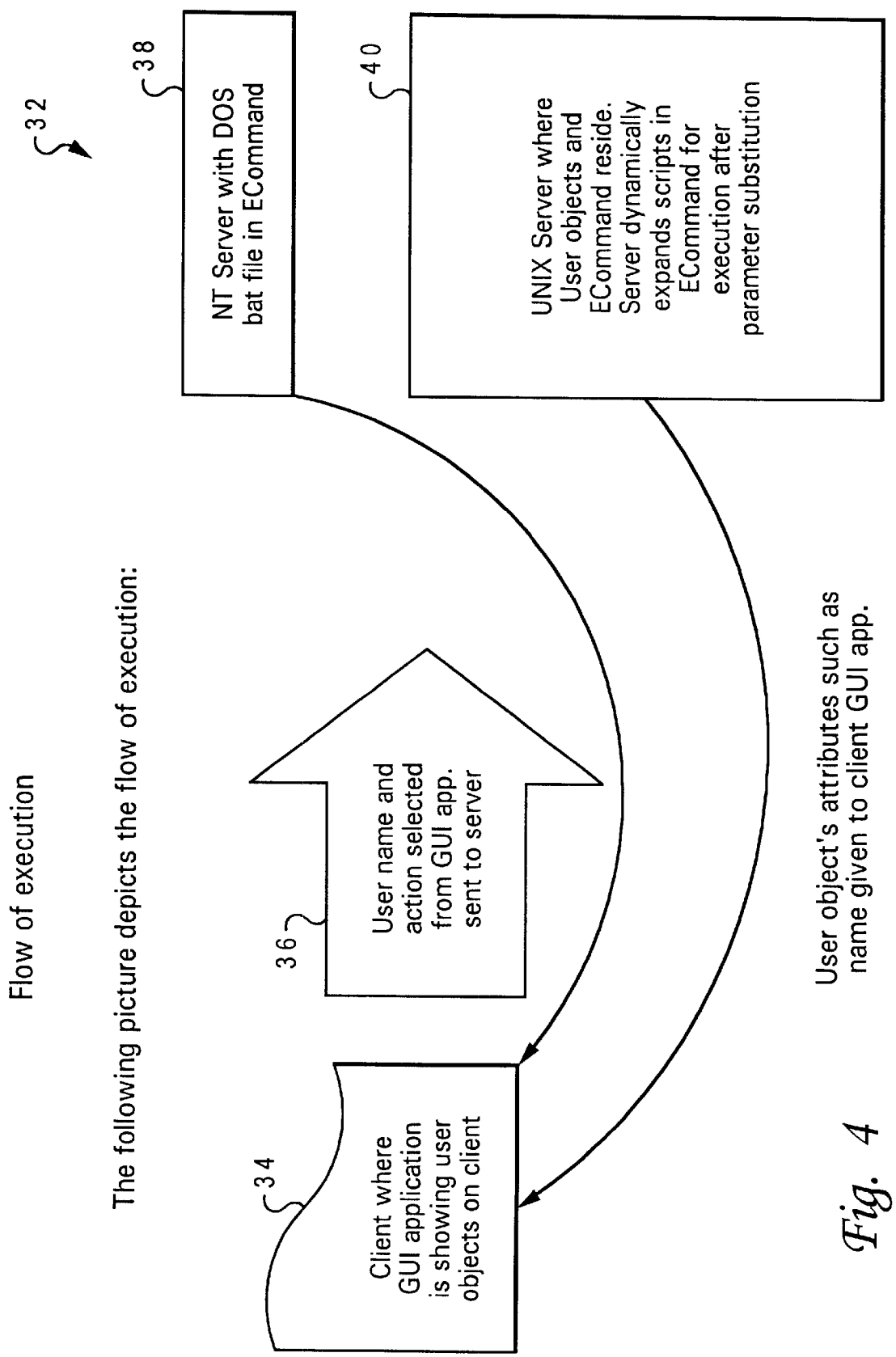
FIG. 4 is a flow diagram illustrating an exemplary execution of the present invention that provides parameter expansion, generation, and execution of a script in a networked environment using objects.

With reference now to the figures and in particular with reference to FIG. 4, a flow diagram 32 that illustrates an exemplary execution of the present invention for providing parameter expansion, generation, and execution of scripts in a networked environment using objects is shown. The parameter expansion and the generation and execution of scripts in different platforms are achieved in the manner discussed in detail earlier. At block 34 of flow diagram 32, client system 10 is where GUI application 16 is showing user objects 15 from server system 12 onto client system 10. GUI application 16 on client system 10 serves as a way to manage resources on server system 12. For example, a web based system manager application on an AIX system may be used. GUI application 16 displays a collection of user objects 15 of server system 12 onto client system 10. System administrator 2 selects an operation (i.e. delete User, change password, etc.) to be performed on a selected user object 15. Flow diagram 32 moves to block 36. At block 36, the selected user object (i.e user name) and the selected request for the selected operation are sent from GUI 16 on client system 10 to server system 12 (via the ORB 6 on the server system 12). Respective server system 12 has the respective user objects 15, whether it is the NT server system in block 38 or the UNIX server system 40 as shown in FIG. 4 or any other type of operating system since the present invention supports multiple operating systems (i.e. heterogeneous environment). Server system 12 receives the selected user object 15 (i.e. user name) and the request for the selected operation (see FIG. 2). The respectively selected user object 15 calls ECommand 21 to generate and expand a script for the named stanza 28 (e.g., the selected operation such as delete, change password, etc.). ECommand 21 obtains the arguments, flags, or values to the script from the properties of the selected user object 15 (i.e. either the properties for User A or User B depending on which one was selected and passed from the client server 10) and the value defining table(s) 50 (such as a table or hash table 50 shown in FIG. 6). ECommand 21 basically involves a script generating algorithm, and thus, ECommand 21 expands to automatically generate scripts. ECommand 21 is informed of various values that are prefix names (i.e. as will be discussed later as examples the values "User" and "Action" are prefix names). In the present invention, objects that represent or are associated with a prefix name(s) are able to be passed into the script generating ECommand 21. ECommand 21 is able to retrieve the appropriate values, arguments, or flags (i.e. as will be discussed later for the example the prefix values of "Name" and "Deletable for the prefix "User" and the prefix value "Name" for the prefix "Action"). The values, arguments, or flags are substituted dynamically to respectively to provide actual values for the prefix values (i.e. variables associated with prefix name(s)) by ECommand 21. Value defining table 50 has any additional information required for the scripts and passes any needed flags for the selected operation. Block 38 shows that the generic scripts may be generated and used by the NT server having a DOS bat file in ECommand 21, and block 40 shows the generic scripts may be generated and used by the UNIX server which has the managed object class (e.g., User Object class 15A) and ECommand 21 installed and residing thereat. The UNIX server dynamically expands scripts in ECommand 21 for execution after parameter substitution.

Thus, ECommand 21 is set up and installed with a shell script and a list of prefix values that are associated to prefix names. ECommand 21 evaluates the script to determine which object values are needed for the indicated prefix values. ECommand 21 is informed of the various values that are prefix names and passed a set of objects representing the prefix names from client system 10, and the prefix values that the shell script needs are retrieved from the objects. Thus, by informing and indicating to script generator ECommand 21 of the values that are prefix names, the set of objects that represent the prefix names are able to be simply passed to ECommand 21, and ECommand 21 retrieves the appropriate values for the needed prefix values from the objects.

The various example formats shown in FIGS. 5A to 5C illustrate the building process of ECommand 21. After ECommand 21 is built, it is installed onto server system 12 (e.g., the building and installing processes are generally done by a software developer or such person). With reference now to FIG. 5A, a sample code for an original script-generating command (".cmd") file 80 that is used to develop ECommand 21 which is installed onto server system 12 is shown. For example, a software developer or other such person generally develops file 80 containing this code, and the code is named "UserScript.cmd" as shown in FIG. 5A. Software build tools read the UserScript.cmd file and generate a UserScript.java file (e.g., see FIG. 5C). FIG. 5C shows an example JAVA command file 94 generated from original command file 80 of FIG. 5A. Original command file 80 is converted to JAVA command file 94 of FIG. 5C by using various software tools. Generated JAVA file 94 of FIG. 5C is compiled by a compiler to produce the ECommand class 21 that resides on server system 12. JAVA file 94 shows respective prefix names 84A and 84B (i.e. "user" and "action") and respective prefix values 85, 86, (i.e. "name" and "deleteable" for "user") and 87 (i.e. "name" for "action").

Managed object ("Mobject") identifer 83 and Hashtable identifier 85 are data retrieval identifiers for identifying the manner as to how to obtain or retrieve data for prefix names 84. Prefix names 84 shown in FIG. 5A are prefix "user" 84A and prefix "action" 84B. Prefix values 85 and 86, "name" and "deletable", are for prefix "user" 84A, and prefix value 85, "name", is for prefix "action" 84B. ECommand 21 evaluates the script to determine which values are needed for various indicated prefix values for a selected managed object 15 (i.e. user A or B or both selected by the system administrator 2). User 84A and action 84B are identified to ECommand 21 as prefix names 84. Prefix values 85, 86, and 87 for prefix names 84A and 84B that the shell script needs are retrieved from selected managed object 15.

Original command file 80 also has an exemplary method or stanza 28A that is a stanza having a tag name identifier to allow the UserScript.cmd to be converted into a JAVA file, UserScript.java, or other computer language program file. Stanza or method 28A contains actual scripts 81. Other stanzas or methods 28 (e.g., see stanzas 28B to 28D of FIG. 5B) with respective actual scripts 81 may be defined for other respective operations to be performed on the selected managed object 15. Software build tools are used by the software developer or other such person to perform the build process which converts original command file 80 in FIG. 5A containing the code into a JAVA or other language program file 94 (i.e. UserScript.java such as shown in FIG. 5C or User Script.otherlanguage). JAVA or other language program file 94 is compiled by a respective compiler to generate ECommand 21 that is then installed on server system 12.

Referring now to FIG. 5B, an example of a simplified JAVA User Object class 15A, which is a format example of a managed object class 15 on server system 12, is shown. User Object class format 15A is generated, produced, and installed/written on server system 12 by a software developer or other such person. FIG. 5B shows that JAVA User Object class 15A allows user objects 15 to be provided and respectively defined on server system 12. The format of User Object class 15A comprises a User Object constructor method 90 for constructing user objects and various stanzas or methods 28A, 28B, 28C, and/or 28D that are to be implemented and executed on the various user objects to perform the selected operation(s) by the system administrator 2. As examples, FIG. 5B shows stanza 28A which is a method to delete the user, stanza 28B is a method to force delete the user, stanza 28C is a method to obtain property values of a user object (i.e. getPropertyValues method), and stanza 28D is a method to determine if the user is deletable.

An instance or selected managed object or user object 15 (in the example, would either be the selected user A or B or both by the system administrator 2) of object class 15A of FIG. 5B calls ECommand 21 that was generated from compiling JAVA command file 94 of FIG. 5C. When ECommand 21 is called to do the expansion of delete stanza 28A, then ECommand 21 calls a "get property values" method to obtain the value for "name" 85 for "user" 84A. The value for "name" 87 for "action" 84B is obtained from a value defining table (such as hash table 50 in FIG. 6). The present example only shows a script that takes only two arguments. When a script requires multiple arguments, the generation of the script by ECommand 21 avoids and eliminates having to hand-code the arguments into the JAVA code (such as UserObject 44), which is quite cumbersome and error prone.

With reference now to FIG. 5D, script 96 with the values/parameters expanded and generated by ECommand 21 is shown. Script 96 shows that "name" 87 for "action" 84B (i.e. Action_Name) has been defined to be "Force Delete", "name" 85 for "user" 84A (i.e. User_Name) has been defined to be "root" or "dummyUser", and "deletable" 86 for "user" 84A (i.e. User_Deletable) has been defined to be "false". Script 96 also contains some debugging information 89.

Referring now to FIG. 6, a block diagram of an exemplary value defining table 50 (e.g., hash table in JAVA) for the present invention is shown. Table 50 has various operations or variables listed in column 51, such as a FORCE action 52, variable V 56, and variable F 60. Column 53 contains the defined values for the operations or variables in column 51. For example, a Boolean value such as True or False is set and defined for FORCE action 51. An "a" value is assigned and defined for variable "V" while a "z" value is assigned and defined for variable "F".

Figure 7:
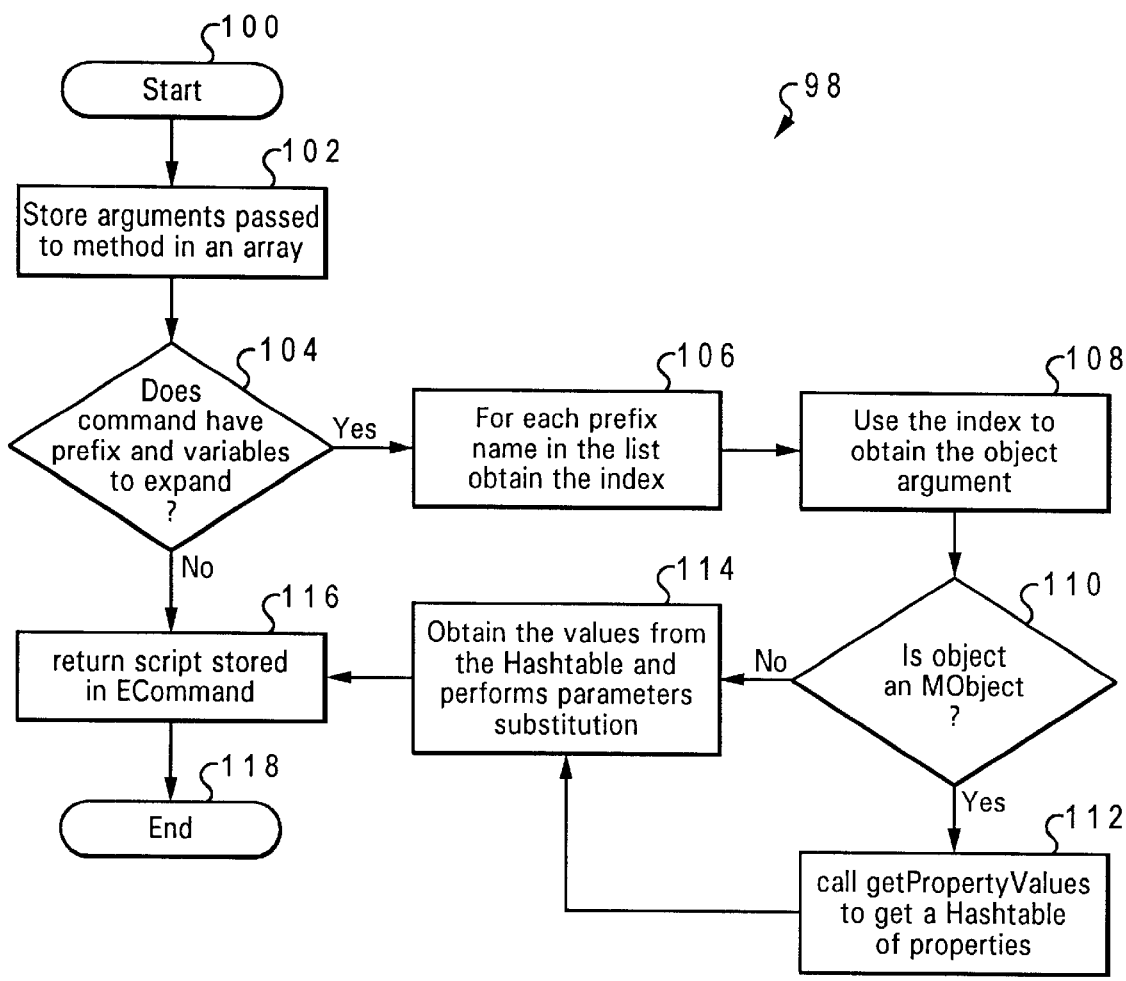
FIG. 7 is a flow chart of an exemplary algorithm for executing the script generating command (e.g., "Ecommand") for the present invention that provides parameter expansion, generation, and execution of script in a networked environment using objects.

With reference now to the figures and in particular with reference to FIG. 7, a flow chart that illustrates method 98 for executing ECommand 21 (on server system 12) to generate a script with the expanded values and parameters for the present invention is shown. Method 98 starts at block 100. Method 98 moves to block 102, where arguments that are passed to the method are stored in an array. Method 98 moves to decision block 104. At decision block 104, method 98 determines whether the script-generating command or Ecommand 21 has prefix names and prefix values (i.e. variables) that need to be expanded. If method 98 does have such prefix names and prefix values, then method 98 moves to block 106.

At block 106, the index is obtained for each prefix name in the list. The method moves to block 108. At block 108, the index is used to obtain the object argument since the index provides a one to one mapping between prefix name list and object arguments list. Method 98 moves to decision block 110. At decision block 110, method 98 determines whether the object is a managed object ("MObject"). If the object is a managed object ("MObject"), then method 98 moves to block 112 where a method for obtaining property values (i.e. getPropertyValues) to get a table of properties (such as a table 50 in FIG. 6) as called. Method 98 then moves to block 114. If the object is not a managed object ("MObject"), then method 98 moves directly to block 114. At block 114, the values from the table 50 are obtained, and parameters substitution is performed. Method 98 then moves directly to block 116. If at decision block 104, ECommand 21 does not have prefix names and prefix values to expand, then method 98 moves to decision block 116. At decision block 116, the script that is returned is stored in ECommand 21. Method 98 ends at block 118.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for building a script-generating command file for a particular platform in a network environment, said method comprising:

creating a script-generating command file, said script-generating command file including (1) an operation identifier identifying an operation, (2) a plurality of platform-specific scripts, each executable by a different software platform to perform the operation, and (3) a list of prefix names and associated prefix values applicable to all of said plurality of platform-specific scripts;

converting said script-generating command file into a program language script-generating command file; and compiling said program language script-generating command file to obtain a platform-specific script-generating command file.

2. The method according to claim 1, wherein creating a script-generating command file further comprises creating a script-generating command file in which the operation is identified by a stanza name.

3. The method of claim 1, wherein converting said script-generating command file comprises converting said script-generating command file into a JAVA script-generating command file.

4. The method of claim 1, and further comprising installing said platform-specific script-generating command file on a server system running a compatible platform within the network environment.

5. The method of claim 4, and further comprising:

in response to receipt at the server system of an invocation of the platform-specific script-generating command file responsive to a request by a client system within said network environment, said invocation referencing an object to be operated upon and a desired operation:

performing parameter expansion by automatically obtaining, from data sources identified by said prefix names, values for said prefix values and inserting the obtained values into a platform-specific script within said platform-specific script-generating command file; and storing said platform-specific script at said server.

6. A method for generating a script in a network environment including a client system and a server system coupled for communication by a communication network, said method comprising:

storing at said server system a script-generating command, said script-generating command including (1) a script and (2) a list of prefix names and associated prefix values for the script;

in response to receipt of an invocation of the script-generating command responsive to a request by said client, said invocation referencing an object to be operated upon and a desired operation:
performing parameter expansion by automatically obtaining, from data sources identified by said prefix names, values for said prefix values and inserting the obtained values into said script; and
storing said script at said server system.

7. The method according to claim 6, wherein one of said prefix names identifies a table as a data source, and wherein performing parameters expansion comprises:
retrieving at least one values for a prefix value from the table.

8. The method of claim 6, wherein one of said prefix names identifies said object as a data source, said object having a method, and wherein performing parameter expansion comprises:
retrieving at least one values for a prefix value by invoking the method of the object.

9. The method of claim 6, and further comprising receiving said invocation of the script-generating command from said object, wherein said object resides on said server system.

10. The method of claim 9, and further comprising:
providing at said client system an object representation of said object residing on said server system; and
in response to user selection of said object representation at said client system, transmitting said request from said client system to said server system to cause said object residing at said server system to invoke said script-generating command.

11. A data processing system for building a script-generating command file for a particular platform in a network environment, said data processing system comprising:
means for creating a script-generating command file, said script-generating command file including (1) an operation identifier identifying an operation, (2) a plurality of platform-specific scripts, each executable by a different software platform to perform the operation, and (3) a list of prefix names and associated prefix values applicable to all of said plurality of platform-specific scripts;
means for converting said script-generating command file into a program language script-generating command file; and
means for compiling said program language script-generating command file to obtain a platform-specific script-generating command file.

12. The data processing system according to claim 11, wherein said means for creating a script-generating command file further comprises means for creating a script-generating command file in which the operation is identified by a stanza name.

13. The data processing system of claim 11, wherein said means for converting said script-generating command file comprises means for converting said script-generating command file into a JAVA script-generating command file.

14. The data processing system of claim 11, and further comprising means for installing said platform-specific script-generating command file on a server system running a compatible platform within the network environment.

15. A server data processing system for generating a script in a network environment including a client system coupled for communication by a communication network, said server data processing system comprising:
a processor;
a communication interface for communication with said client system; and
data storage coupled to said processor, said data storage storing an object and a script-generating command, said script-generating command including:
a script;
a list of prefix names and associated prefix values for the script;
means, responsive to receipt of an invocation of the script-generating command responsive to a request by said client system received via said communication interface, said invocation referencing an object to be operated upon and a desired operation, for:
performing parameter expansion by automatically obtaining, from data sources identified by said prefix names, values for said prefix values and inserting the obtained values into said script; and
storing said script within said data storage.

16. The server data processing system according to claim 15, wherein:
said data storage includes a table;
one of said prefix names identifies the table as a data source; and
said means for performing parameter expansion comprises means for retrieving at least one value for a prefix value from the table.

17. The server data processing system of claim 15, wherein:
one of said prefix names identifies said object as a data source;
said object has a method; and
said means for performing parameter expansion comprises means for retrieving at least one value for a prefix value by invoking the method of the object.

18. The server data processing system of claim 15, wherein:
said invocation is received by said script-generating command from said object; and
said object includes means for invoking said script-generating command in response to receipt of a request from said client system, said request specifying said object and said desired operation.

19. A program product for building a script-generating command file for a particular platform in a network environment, said program comprising a computer-readable medium including:
means for creating a script-generating command file, said script-generating command file including (1) an operation identifier identifying an operation, (2) a plurality of platform-specific scripts, each executable by a different software platform to perform the operation, and (3) a list of prefix names and associated prefix values applicable to all of said plurality of platform-specific scripts;
means for converting said script-generating command file into a program language script-generating command file; and
means for compiling said program language script-generating command file to obtain a platform-specific script-generating command file.

20. The program product according to claim 19, wherein said means for creating a script-generating command file further comprises means for creating a script-generating command file in which the operation is identified by a stanza name.

21. The program product of claim 19, wherein said means for converting said script-generating command file comprises means for converting said script-generating command file into a JAVA script-generating command file.

22. The program product of claim 19, and further comprising means for installing said platform-specific script-generating command file on a server system running a compatible platform within the network environment.

23. A program product for generating a script in a network environment including a server system and a client system coupled for communication by a communication network, said program product comprising a computer readable medium including:

a computer usable medium; and a script-generating command encoded within said computer usable medium, said script-generating command including:

a script;

a list of prefix names and associated prefix values for the script; and means, responsive to receipt of an invocation of the script-generating command responsive to a request by said client system received via said communication interface, said invocation referencing an object to be operated upon and a desired operation, for:

performing parameter expansion by automatically obtaining, from data sources identified by said prefix names, values for said prefix values and inserting the obtained values into said script; and storing said script within said data storage.

24. The program product according to claim 23, wherein:

one of said prefix names identifies a table as a data source; and said means for performing parameter expansion comprises means for retrieving at least one value for a prefix value from the table.

25. The program product of claim 23, wherein:

one of said prefix names identifies said object as a data source;

said object has a method; and said means for performing parameter expansion comprises means for retrieving at least one value for a prefix value by invoking the method of the object.

26. The program product of claim 23, and further comprising the object, wherein said invocation is received by said script-generating command from said object, and wherein said object includes means for invoking said script-generating command in response to receipt of a request from said client system, said request specifying said object and said desired operation.

\* \* \* \* \*